United States Patent [19]

Yamanaka et al.

[11] Patent Number: 4,994,305
[45] Date of Patent: Feb. 19, 1991

[54] METHOD FOR PRODUCING MAGNETIC RECORDING MEDIUM

[75] Inventors: Fusao Yamanaka; makoto Nagao; Kazuhiko Morita, all of Kanagawa, Japan

[73] Assignee: Fuji Photo Film Co., Ltd., Minami-Ashigara, Japan

[21] Appl. No.: 318,408

[22] Filed: Mar. 3, 1989

[30] Foreign Application Priority Data

Mar. 4, 1988 [JP] Japan .................................. 63-49810

[51] Int. Cl.⁵ ............................................. B05D 5/12
[52] U.S. Cl. .................................. 427/132; 204/192.2; 427/174; 427/251
[58] Field of Search ............................... 427/127–132, 427/48, 174; 428/684, 251, 900; 204/192.2

Primary Examiner—Bernard Pianalto
Attorney, Agent, or Firm—Sughrue, Mion, Zinn, Macpeak & Seas

[57] ABSTRACT

A method for producing a magnetic recording medium in which a flexible nonmagnetic support is moved continuously while being retained in contact with a plurality of spaced apart cylindrical cans to form thin films of metal on opposite sides of the support successively at portions where the support is in contact with the cylindrical cans. The tension of the support with respect to the Young's modulus thereof is adjusted to satisfy predetermined conditional expressions in each of a plurality of support conveyance sections which are defined by the spaced cylindrical cans.

4 Claims, 2 Drawing Sheets

METHOD FOR PRODUCING MAGNETIC RECORDING MEDIUM

BACKGROUND OF THE INVENTION

The present invention relates to a method for producing a magnetic recording medium and, more particularly, to a magnetic recording medium producing method for applying a ferromagnetic material onto a continuously running belt-like nonmagnetic support employing evaporation, sputtering or the like to thereby form a magnetic layer on the nonmagnetic support.

Heretofore, a coating-type magnetic recording medium, produced by applying onto a desired type of a support various types of ferromagnetic metal powder dispersed in a binder by use of an organic solvent, has been commonly used as a magnetic recording medium. On the other hand, a magnetic recording medium having a ferromagnetic metal thin film as a magnetic recording layer, for example, formed using a vapor deposition method such as vacuum evaporation, sputtering, ion plating, or the like, has been more widely used in view of the recent increase in demand for high-density recording.

For example, the aforementioned magnetic recording medium having a thin film of metal as a recording layer is produced by vacuum evaporation or sputtering of ferromagnetic material onto a flexible nonmagnetic support such as polyester film or the like successively at portions which contact cylindrical cans while moving the support guided by guide rollers or cylindrical cans disposed within a vacuum tank.

In general, the tension of the nonmagnetic support during the running thereof is stabilized by adjusting the driving torque between a supply roll and a take-up roll for the nonmagnetic support or by means of a dancer roll disposed in the conveyance system.

The reason why the tension should be stabilized is as follows. Because there is no influence on the running of the nonmagnetic support by air between the nonmagnetic support and the respective cylindrical can in a vacuum or near vacuum, the nonmagnetic support adheres closely to the surface of the cylindrical can. Accordingly, there often arises a considerable difference between tension values of the nonmagnetic support before and after cylindrical can. Consequently, creases or scratches on the support itself, and on the film formed on the support, often arise due to the resulting tensile forces acting on the nonmagnetic support.

Proposals for stabilizing this tension have been disclosed in Japanese Unexamined Patent Publications Nos. 61-278032 and 61-264514. However, theoretical elucidation has not been provided yet. In particular, in the case where a plurality of cylindrical cans are used, not only operations of adjusting the tension corresponding to the respective cylindrical cans must be carried out separately, but also the production equipment must be adjusted whenever the type of nonmagnetic support is changed. In short, many production problems remain. Further, exact tension adjustment has been very difficult because, in general, the accuracy of the tension adjustment depends on the degree of the operator's skill. Further, curling can readily arise in the magnetic recording medium produced by the aforementioned production process. This is the case because cylindrical cans are used or because the magnetic film and the nonmagnetic support are distorted somewhat differently. In practical use, curl balance must be maintained.

It, however, has proven very difficult to obtain good results at all points though avoidance of heat-induced damage and the like, and curl balance may have to be adjusted independently. This is because various set conditions (adjustment conditions) are unavoidably interrelated. When, for example, the amount of tension is increased for the purpose of preventing heat damage, the tension is complexly accumulated in the form of relatively large internal stress both inside the support and inside the thin film formed by the cylindrical can and, consequently, large curls arise easily in the resulting article.

Accordingly, the tension (one of the conveyance conditions) had to be readjusted whenever supports or films were change to others having different physical properties. In particular, in the case where different types of supports or in the case where the films formed on the supports were different in the quality of material and thickness, respective tension conditions had to be readjusted.

Further, the conveyance conditions established for one apparatus could not be applied to other production apparatuses. Accordingly, it was necessary to determine anew the optimum conditions for each different production apparatus. Further, reproducibility of curls was poor. Moreover, as the result of investigations and development carried out by the present inventors, it was found that magnetic films formed when using independent adjustment of the tension as described above were inferior in durability against friction because the quantity of change of the tension increased during the film preparation process to thereby partially change the internal stress of the film and, consequently, the durability and running characteristic of the magnetic recording medium were less than desirable.

SUMMARY OF THE INVENTION

It is therefore an object of the present invention to provide a method for producing a magnetic recording medium which assures that the film is free from heat damage and is excellent in curl balance and durability.

The foregoing and other objects of the present invention are attained by a method for producing a magnetic recording medium in which a flexible support made of plastic resin is moved continuously while being kept in contact with a plurality of spaced cylindrical cans to form thin films of metal on the support successively at the contacting portions of the support with respect to the cylindrical cans. In accordance with the invention, the tension of the support with respect to the Young's modulus thereof in each of the support conveyance sections which are defined by the spaced apart cylindrical cans is adjusted so as to satisfy the following relations:

$$5.0 \times 10^{-4} < T_1/Y_i < 3.0 \times 10^{-3} \qquad (1)$$

$$-7.0 \times 10^{-4} < \Delta(T_i/Y_i) < 7.0 \times 10^{-4} \qquad (2)$$

wherein $\Delta(T_i/Y_i) = T_i/Y_i - T_{i-1}/Y_{i-1}$. In these relations, $T_i$ represents the tension per unit of cross-sectional area of the i-th support conveyance section in the forward direction of support conveyance and $Y_i$ represents the Young's modulus of the support in a corresponding one of the support conveyance sections on which $T_i$ acts.

In accordance with the invention, in the initial stage before the process of film preparation, the Young's modulus $Y_i$ of the support can be expressed as a Young's modulus peculiar to the support. During the film preparation process, however, the Young's modulus of the support changes depending on the type and thickness of the thin film layer formed in the prior stage and, in short, varies with each support conveyance section.

As used herein, the tension $T_i$ represents the tension ($T_i$) in the i-th conveyance section in the forward direction of support conveyance as defined by the separated cylindrical cans along the conveyance path of the support. Where the tension ($T_i$) is sensed is not specifically limited. It is preferable though that the tension sensing position be in the respective conveyance section and be near the film preparation position. Thus, $T_i/Y_i$ represents the torsion of the support at a position within the i-th support conveyance section in the forward direction of support conveyance and near the film preparation position.

Accordingly, relation (1) above in accordance with the present invention represents a condition defining the amount of distortion in the support made of plastic resin. In other words, relation (1) describes a condition for maintaining a suitable curl balance by limiting the magnitude of internal stress accumulated in the thin metal film layer formed on the support, thereby controlling the amount of distortion. On the other hand, relation (2) represents a condition for defining the distortion change amount of the support between adjacent support conveyance sections. In other words, relation (2) relates to a condition for improving the mechanical strength by the stabilization of internal stresses in the thin film layer by controlling the distortion change amount of the support and, accordingly, by controlling the change amount of internal stress accumulated in the thin film.

BRIEF DESCRIPTION OF THE DRAWINGS

Other features and advantages of the present invention will be apparent from the following description taken in connection with the accompanying drawings, wherein.

DESCRIPTION OF THE PREFERRED EMBODIMENTS

The present invention will now be described with reference to preferred embodiments thereof and with reference to the drawings.

Figure 1:
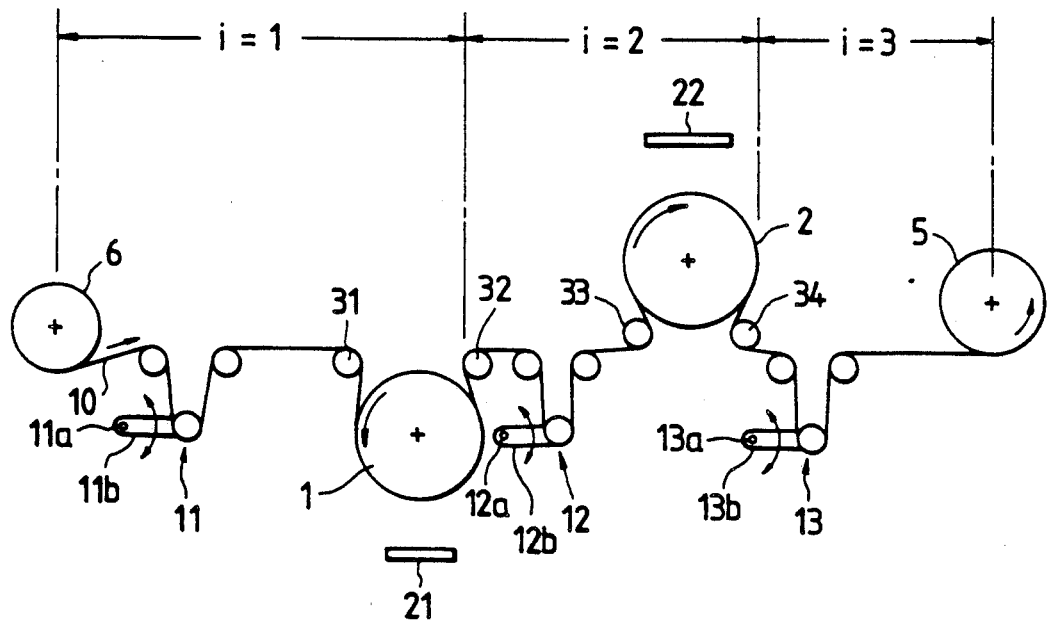
FIG. 1 is a schematic diagram showing the film preparation process in an apparatus using a production method according to the present invention.

Referring to FIG. 1, there are illustrated a series of production steps wherein a support 10 made of plastic resin is fed from a supply reel 6, thin films of metal are successively formed on the opposite sides of the support at cylindrical cans 1 and 2, and the support after film preparation is wound up on a take-up reel 5. In this film preparation process, tension is suitably applied to the support 10. In accordance with the present invention, the basic tension in the film preparation process is determined by setting the take-up force from the take up reel 5 and, if necessary, by applying a reverse rotational force to the supply reel 6 such that the tension of the support 10 is held at a predetermined value by dancer rollers 11, 12 and 13 arranged at suitable positions along the support conveyance path.

FIG. 1 illustrating this embodiment shows a film preparation method employing sputtering in which film preparation sources 21 and 22 are arranged corresponding to the cylindrical cans 1 and 2. As is known, the cylindrical cans 1 and 2 are constructed so that the support 10 can be suitably cooled to be protected from heat generated during the film producing process.

The dancer rollers 11, 12 and 13 are arranged in the first, second and third support conveyance sections, respectively, as shown in the drawing. The support 10 is wrapped around the dancer rollers 11, 12 and 13 at suitable angles. Arms 11b, 12b and 13b to which the rollers are rotatably fixed are pivoted (in the direction of the arrow A shown in the drawing) about shafts 11a, 12a and 13a, respectively, to tighten the support 10 to thereby stabilize the tension in the support. Synchronous motors are connected to respective ones of the dancer rollers with which the pivot angles of the arms 11b, 12b and 13b are detected and signals produced which are used for adjustment of tension.

As described above, the dancer rollers 11, 12 and 13 are arranged in the respective support conveyance sections (i = 1, 2, 3) to detect the tension of the support. As is known, each of the dancer rollers 11, 12 and 13 has a distortion sensor arranged at the end portion of the roller shaft so that the tension of the support can be measured electrically at the point where the roller is arranged. Accordingly, it can be ascertained whether or not the tension in the conveyance system is suitable. Problems such as hard winding of the support roll taken up by the take-up reel 5 and the like can be prevented by using a tapering tension method in which the take-up force of the take-up reel 5 decreases as the winding diameter increases.

In the production process according to the invention, the tension $T_i$ in the first support conveyance section (i=1) in the forward direction of support conveyance can be estimated by the position of the dancer roller 11 for convenience, although in actuality the tension varies somewhat depending on the point of measurement. The tension $T_2$ in the second support conveyance section (i=2) can be expressed by the position of the roller 12 relative to the dancer roller 11. The tension in the other support conveyance section (i=3) can be expressed in the same manner as described above.

The Young's modulus $Y_1$ in the first support conveyance section (i=1) is peculiar to the plastic resin support. At the contacting portion of the support with the cylindrical can 1, a first thin film layer is formed on the surface of the support 10 by use of the film preparation source 21. Then, a second thin film layer is formed on the opposite surface of the support by use of the film preparation source 22 in the second support conveyance section (i=2). In this case, the Young's modulus $Y_2$ has a value obtained by adding the Young's modulus of the first thin film layer formed by sputtering in the prior process to the Young's modulus of the support. The Young's modulus $Y_3$ in the third support conveyance section (i=3) is the sum of the Young's modulus of the support and the Young's moduli of the two thin film layers formed in the prior process.

Figure 2:
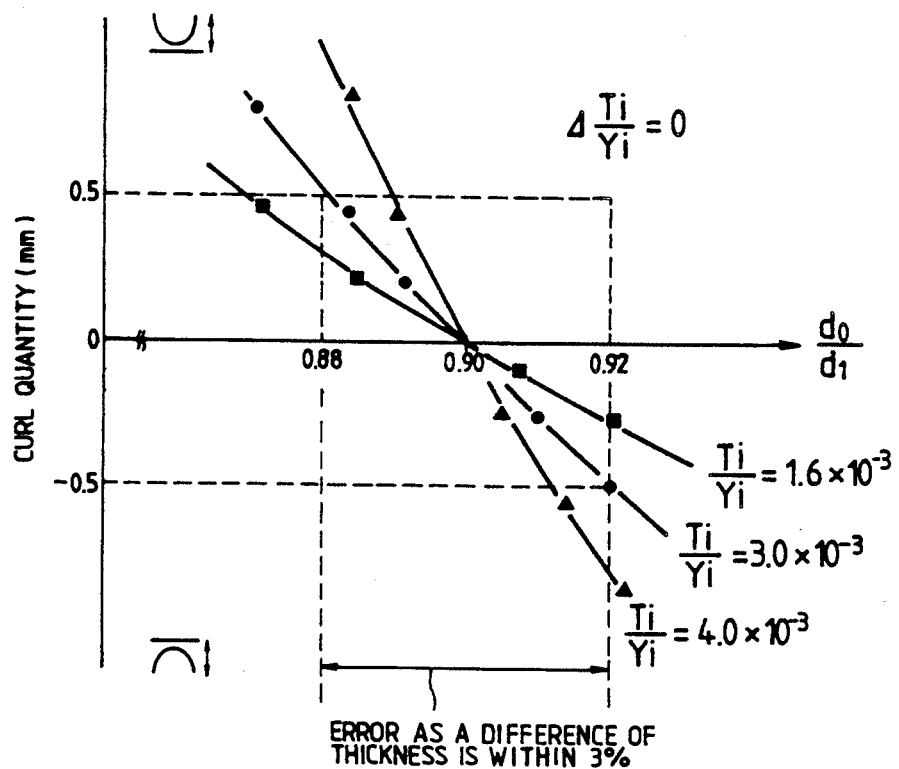
FIG. 2 is a graph of thickness ratio vs. curl quantity in the case where a thin film is applied onto the opposite sides of the support.

The support 10 is formed of plastic resin which is, preferably, relatively large in Young's modulus, i.e., about 400 to about 700 kg/mm². Examples of suitable plastic resins include polyethylene terephthalate, cellulose triacetate, polyethylene naphthalate, polyamide, polyimide and the like. The thin film layers are formed by applying a ferromagnetic metal such as iron, cobalt, nickel and the like or magnetic alloys thereof onto the support. In the case of magnetic tape, magnetic discs or the like, the thickness of the thin film layers is preferably within a range of from 0.05 μm to 0.4 μm. If $T_i/Y_i$ (=distortion ($\epsilon_i$)) in relation (1) in accordance with the present invention is large, the upper limit thereof can be expressed by a value based on the magnitude of the curl quantity. FIG. 2 graphically shows the relationship among the thickness ratio ($d_0/d_i$) of the upper and lower surfaces (the surface formed first is taken as "side I" and the opposite surface a "side 0") of the support formed of polyethylene terephthalate, the curl state, and the amount of distortion ($\epsilon_i$). Assuming that the distortion difference $\epsilon T_i/Y_i$ between the support conveyance sections for the sides I and O is zero and that the curl quantity is within 0.5 mm for a support width of 100 mm in the case where the error as a difference of thickness between the sides I and O is within 3%, FIG. 2 shows the fact that it is preferable from the viewpoint of curl balance for $T_i/Y_i$ to be less than $3.0 \times 10^{-3}$.

In the case of $\Delta T_i/Y_i = O$ (the amounts of distortion ($\epsilon_i$) of the support films at the upper and lower surfaces are the same) as shown in FIG. 2, and when thin films of the same material are used, the thickness ratio $d_0/d_1$ which makes the curl quantity zero is, in general, not 1. The reason for this is that, when thin films are applied onto the upper and lower surfaces of the support, the curl quantity is apt to be affected by the internal stress of the last film side (side O in FIG. 2). Accordingly, in general, the ratio $d_0/d_1$ has a value of about 0.9, as shown in FIG. 2. However, in the case where it is preferable that the thin films on both sides have thicknesses as closely equal as possible for the purpose of equalizing the physical properties of the two sides, such as in the case of a floppy disc, it is possible to adjust the curl quantity to zero where $d_0/d_1$ is near 1 by adjusting the tension $T_i$ to change $\Delta T_i/Y_i$ suitably.

Although the ideal is that $T_i/Y_i$ (=distortion ($\epsilon_i$)) is zero, it is impossible to achieve this in actual practice. In practice, when the distortion is small, the distortion can be limited by the degree of adherence of the support with respect to the cylindrical cans 1 and 2, which have a cooling function. In short, when the tension ($T_i$) is reduced to in turn reduce the distortion ($\epsilon_i$) of the support 10, the support 10 is deformed and expanded by heat generated from the film preparation source as the degree of adherence of the support 10 to the cylindrical cans is lowered. Consequently, in this case, heat damage such as cracking, breaking and the like occurs. Accordingly, the lower limit of $T_i/Y_i$ can be expressed by the least value of tension ($T_i$) required for avoiding heat damage.

As a result of investigations, in the case where a support of polyethylene terephthalate (PET) with a thickness of 50 μm was used, breaking of the support occurred when $T_i/Y_i$ was not more than $3.0 \times 10^{-4}$, and all heat damage was avoided when $T_i/Y_i$ was not less than $5.0 \times 10^{-4}$. As the result of investigations on the relationship between $T_i/Y_i$ and the amount of heat damage in the cases where supports of polyimide (PI) with thicknesses of 25 μm, 50 μm and 75 μm were used, heat damage such as breaking of the support occurred in most cases when $T_i/Y_i$ was not more than $2.0 \times 10^{-4}$, heat damage less severe than breaking occurred in all cases when $T_i/Y_i$ was $3.0 \times 10^{-4}$, slight heat damage occurred only in the case of a thickness of 25 μm when $T_i/Y_i$ was $3.0 \times 10^{-4}$, and heat damage was entirely avoided in all cases when $T_i/Y_i$ was not less than $5.0 \times 10^{-4}$.

It is apparent from these results that a value of $T_i/Y_i$ not less than $5.0 \times 10^{-4}$ is suitable for avoiding heat damage.

The quantity of heat per unit time applied to the support from the film preparation sources 21 and 22 during film preparation is proportional to the growth rate of the thin film formed on the support. The type of evaporation source, the quantity of evaporation, the distance from the support, and the opening width of the mask located near the can were determined so that the film growth rate on the support was established to be within a range of from 500 to 60,000 Å/min.

The cooling capacity of the can itself depends on the temperature of the can and the surface roughness of the can's surface touching the support. The can employed in the subject invention has the ability of keeping the temperature within a range of from 20° to 250° C. and has a surface roughness of from 0.02 to 0.90 μm as Ra and a cutoff value of 0.25 mm.

The distance between the evaporation source and the support is established to be within a range of from 50 to 150 mm.

It is thus apparent from the above description that the condition needed to keep a suitable curl balance and avoid heat damage to the support 10 is as follows:

$$5.0 \times 10^{-4} < T_i/Y_i < 3.0 \times 10^{-3} \tag{1}$$

Figure 3:
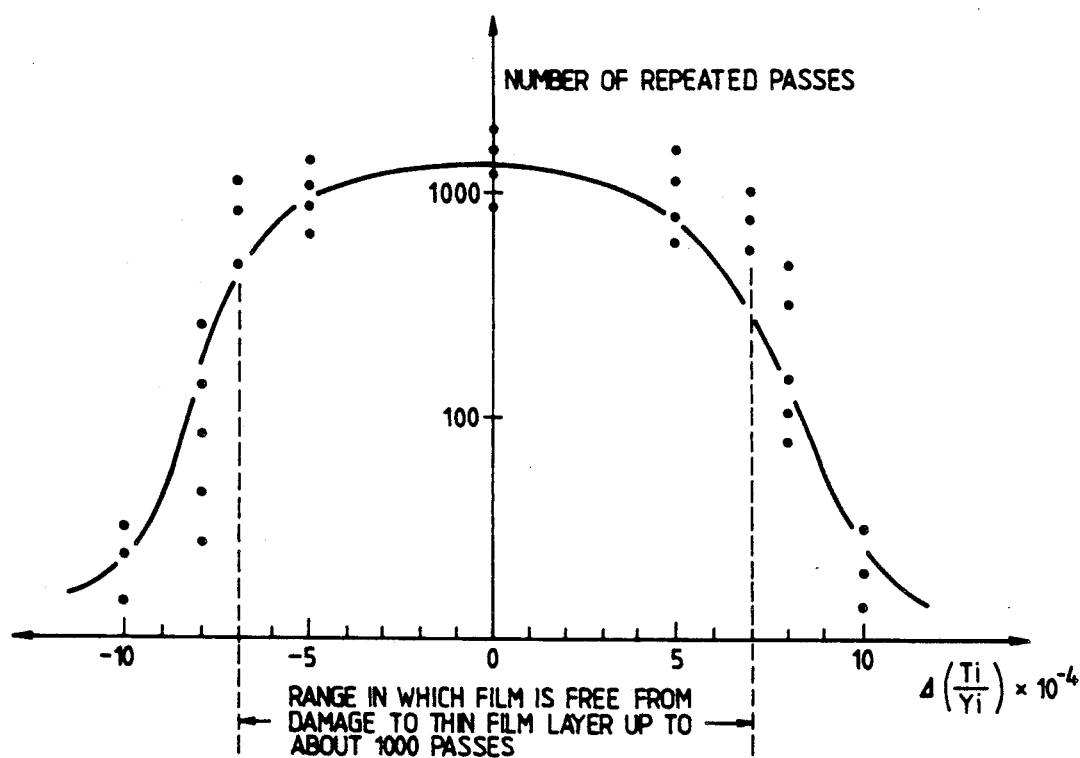
FIG. 3 is a graph showing the relationship of the distortion difference between adjacent support conveyance sections and the number of passes repeated until the film is damaged in a repetitive friction test.

Further, as the result of investigations carried out by the present inventors, the boundary value of durability of the thin film layer is obtained from the distortion difference (change) $\Delta T_i/Y_i$ of the support between adjacent support conveyance sections. FIG. 3 shows the relationship of the distortion difference $\Delta(T_i/Y_i)$ between adjacent support conveyance sections and the number of passes repeated until damage to the film occurs in a repetition friction test. The repetition friction test was carried out under a load of 30 gm using a ¼-inch spherical dummy head made of calcium titanate.

In these tests, film formed in the range of $-7.0 \times 10^{-4} < \Delta(T_i/Y_i) < 7.0 \times 10^{-4}$ was not damaged until about 1000 passes. On the other hand, film formed in the range of $\Delta(T_i/Y_i) > 7.0 \times 10^{-4}$ and $\Delta(T_i/Y_i) < -7.0 \times 10^{-4}$ was easily damaged in 500 passes or less and, accordingly, it is assumed that film formed in these ranges is inferior in adhesion and film strength because of internal distortion accumulated complexly in the respective layers.

In short, film free from damage to the thin film layer up to about 1000 passes and excellent in durability and running characteristics is obtained by forming the film in the range of:

$$-7.0 \times 10^{-4} < \Delta(T_i/Y_i) < 7.0 \times 10^{-4} \tag{2}$$

To cause $T_i/Y_i$ and $\Delta T_i/Y_i$ to fall within the range of the above expressions in the production process shown in FIG. 1, the Young's modulus $Y_i$ for the various support conveyance sections is controlled by factors such as the material of the support 10, the material of which the films are made, the thickness thereof, the temperature, and the like. Accordingly, the factor which can be adjusted is the tension $T_i$. The distortion $\epsilon_i (=T_i/Y_i)$ of the support can be kept in the ranges of the aforementioned expressions (1) and (2) by controlling the supply reel 6 so as to apply a reverse force (load) to the shaft of the supply reel 6 based on detection signals generated by measuring the positions of the free rollers 31 to 34, controlling the output of the driving system to adjust the take-up force of the take-up reel 5, and controlling the output of the driving motor to control the rotational force of the cylindrical cans 1 and 2. The tension $T_i$ is thereby finely adjusted at every support conveyance section.

By controlling the tension $T_i$ as described above, the internal stress of the thin film layers formed on the upper and lower surfaces of the support 10 is balanced, and hence a good curl balance is obtained. At the same time, the internal stress of the thin film layer is made uniform to a fine degree over the entire thin film layer, whereby the strength of the thin film layer is improved. Thus, thin film layers excellent in durability and running characteristics are produced.

Although the embodiment illustrated in FIG. 1 illustrates the case where two cylindrical cans are provided to divide the support conveyance path onto three sections, it is a matter of course that the invention is not limited to the specific embodiment and that a larger number of cylindrical cans may be provided to form multilayered thin film layers.

Figure 4:
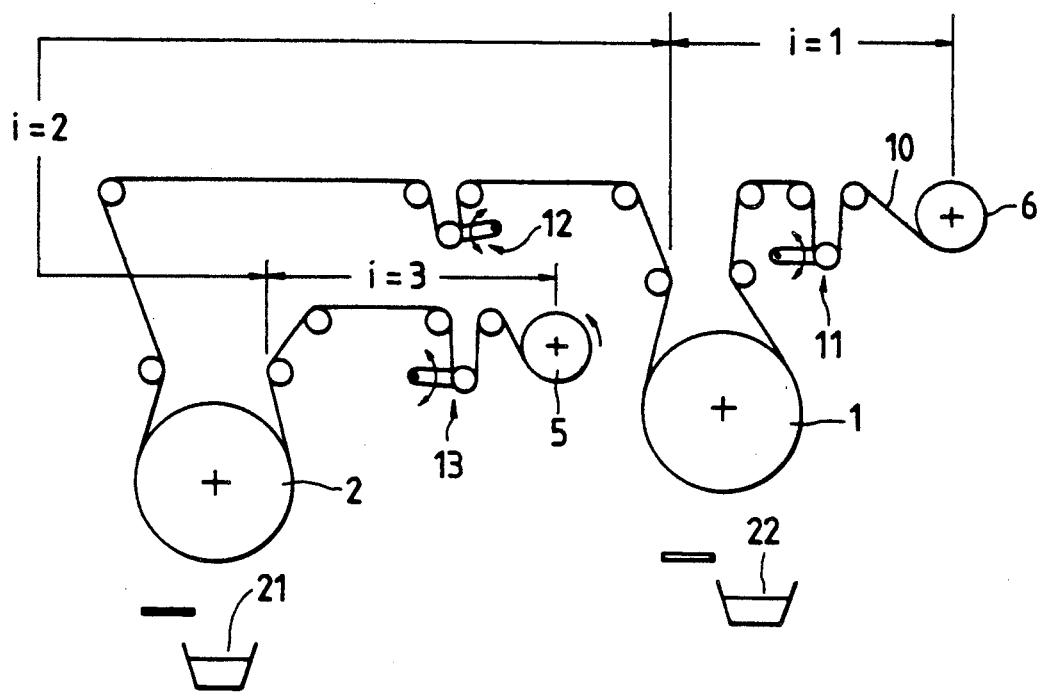
FIG. 4 is a schematic diagram showing the film preparation process in the case where the production method of the present invention is applied to a vacuum evaporating apparatus.

Although the aforementioned embodiment has been described with respect to the case where sputtering is used for film preparation, it is to be understood that the invention is not limited thereto. In particular, the invention is applicable to the case where evaporation, as shown in FIG. 4, is used and both film preparation sources 21 and 22 are arranged below the cylindrical cans 1 and 2 to prepare films on the upper and lower surfaces of the support 10. Any suitable method such as ion plating, CVD, and the like can be used.

As described above, according to the present invention, to ensure that the cylindrical cans contact the support in a suitable manner for cooling the support, the tension of the support is adjusted to satisfy expressions (1) and (2). Further, thin film layers of a magnetic metal are formed on the support, which runs with a stable tension. Accordingly, heat damage to the support is prevented to thereby keep internal stress accumulated in the thin film layers small and stable and, at the same time, to reduce the difference of internal stress between the thin film layers. As a result, the curl balance is kept very good. Further, the distortion of the support during film preparation and during the running of the support is reduced by reducing the tension difference between adjacent support conveyance sections. As a result, the occurrence of creases in the support and cracks in the thin film layers caused by distortion are prevented. Accordingly, a magnetic recording medium having thin film layers having reduced dropout and excellent durability and running characteristics is provided.

Furthermore, the present invention can be easily applied to general production apparatuses used for film formation on a support transported with cylindrical cans, as well as the apparatus illustrated in this specification, because the adjustment range of the tension of the support is expressed clearly by numerical values.

The present invention will be illustrated in more detail by the following Examples, but is not limited thereto.

EXAMPLE 1

Using a production apparatus having three support conveyance sections (two cylindrical cans) as shown in FIG. 1, Permalloy (FeNi) was applied onto a polyethylene terephthalate (PET) film 50 $\mu$m in thickness as a nonmagnetic support to thereby continuously form films having thicknesses of 0.5 $\mu$m on the opposite surfaces of the support. The Young's modulus of the support and the total Young's moduli of the support and the thin metal films in the respective stages are as shown in Table 4.

In the respective cases of film preparation rates of 500 Å/min, 20,000 Å/min and 60,000 Å/min, a magnetic recording medium was produced after the tension ($T_i$) in the respective support conveyance sections was adjusted to satisfy expressions (1) and (2) of the present invention under the condition that the cylindrical cans had a cooling capacity expressed by a surface roughness Ra of 0.090 $\mu$m, cutoff value of 0.25 mm and a temperature of 250° C. The results are shown in Tables 1 to 3, in which numerical values of the tension ($T_i$) intentionally changed are enclosed in parentheses. In Tables 1 to 3, Samples Nos. 19 to 36 illustrate the results of Example 2 described in detail below. In short, Samples Nos. 1 to 5 indicate the results of observation of the film preparation condition in the case where the tension ($T_1$) in the first support conveyance section is changed; sample Nos. 7 to 11 show the results in the case where the tension ($T_2$) in the second support conveyance section is changed; and sample Nos. 13 to 17 show the results in the case where the tension ($T_3$) in the third support conveyance section is changed. In the Tables, numerical values not enclosed in parentheses indicate values established to satisfy expression (2) of the present invention by automatic control of the driving system based on the numerical values enclosed in parentheses. Numerical values not enclosed in parentheses are established to satisfy the relation $\Delta T_i/Y_i = 0$ through calculation from the Young's moduli of Table 1, so that the values of tension have the relations $T_i \approx 0.75 T_2$ and $T_2 \approx 0.83 T_3$.

Sample No. 6 indicates the case where the first support conveyance section and the second conveyance section have the relation $\Delta T_i/Y_i > 17.0 \times 10^{-4}$, or in other words the first and second support conveyance sections do not satisfy expression (2). Sample No. 12 shows a case where all support conveyance sections do not satisfy expression (2). Sample No. 18 corresponds to the case where the second and third support conveyance sections do not satisfy expression (2).

The Evaluation in Tables 1 to 3 was made by judging the appearance through observation of cracks, creases and curls considered to be caused by heat damage to the support and also cracks, creases and curls considered to be caused by changes of tension. For the Evaluation, the mark represents good, the mark Δ represents marginally acceptable, and the mark X represents bad.

In the cases of Samples Nos. 1, 7 and 13 in Tables 1 to 3, many cracks and creases considered to be caused by heat damage were produced because the values ($T_1$), ($T_2$) and ($T_3$) of the tension were too small to satisfy expression (1). In the case of Sample No. 5, an increase of curl quantity considered to be caused by the large value of tension ($T_1$) was observed. In the case of Sample No. 11, a remarkable increase of curl quantity was observed because the values ($T_2$) and ($T_3$) of the tension were too large. In the case of Sample No. 17, not only an increase of curl quantity was observed, but also many cracks and creases caused by an increase of distortion ($\epsilon_i$) were observed because all tension values ($T_1$), ($T_2$) and ($T_3$) were too large to satisfy expression (1).

In the cases of Samples Nos. 6, 12 and 18, expression (2) was not satisfied although expression (1) was satisfied. Accordingly, it became apparent from the friction test (shown in Table 3) that these samples were inferior in durability because the difference of distortion ($\epsilon_i$) was so large that considerable internal stress existed in the thin film layers.

Other samples indicated by the mark O or Δ satisfied expression (1) of the present invention sufficiently.

TABLE 1

Case where Growth Rate of Film on Support Is 500 Å
(Sputtering Source Is Used)

| Sample No. | Film Growth Rate (Å/min) | Cooling Capacity of can Ra(μm) | Temp. | Base | $T_1/Y_1$ | | | Evaluation |
|---|---|---|---|---|---|---|---|---|
| | | | | | i = 1 | i = 2 | i = 3 | |
| 1 | 500 | 0.090 | 250 | PET | (0.10) | 0.13 | 0.26 | X |
| 2 | " | " | " | " | (0.15) | 0.20 | 0.24 | Δ |
| 3 | " | " | " | " | (0.20) | 0.27 | 0.33 | O |
| 4 | " | " | " | " | (0.80) | 1.00 | 1.20 | O |
| 5 | " | " | " | " | (1.30) | 1.60 | 1.93 | Δ |
| 6 | " | " | " | " | (0.80) | (1.50) | 1.81 | X |
| 7 | " | " | " | " | 0.15 | (0.20) | 0.24 | X |
| 8 | " | " | " | " | 0.20 | (0.26) | 0.30 | Δ |
| 9 | " | " | " | " | 0.75 | (2.00) | 1.20 | O |
| 10 | " | " | " | " | 1.20 | (1.60) | 1.93 | O |
| 11 | " | " | " | " | 1.28 | (1.70) | 2.05 | X |
| 12 | " | " | " | " | (0.40) | (1.00) | (1.70) | X |
| 13 | " | " | " | " | 0.19 | 0.25 | (0.30) | Δ |
| 14 | " | " | " | " | 0.38 | 0.50 | (0.60) | O |
| 15 | " | " | " | " | 1.20 | 1.58 | (1.90) | O |
| 16 | " | " | " | " | 1.26 | 1.68 | (2.00) | Δ |
| 17 | " | " | " | " | 1.57 | 2.08 | (2.50) | X |
| 18 | " | " | " | " | 0.30 | (0.40) | (1.10) | X |
| 19 | " | " | " | " | PI | (0.16) | 0.19 | 0.22 | X |
| 20 | " | " | " | " | (0.24) | 0.29 | 0.33 | Δ |
| 21 | " | " | " | " | (0.33) | 0.40 | 0.45 | O |
| 22 | " | " | " | " | (1.30) | 1.57 | 1.78 | O |
| 23 | " | " | " | " | (2.11) | 2.54 | 2.89 | Δ |
| 24 | " | " | " | " | (1.30) | (2.21) | 2.52 | X |
| 25 | " | " | " | " | 0.24 | (0.29) | 0.33 | X |
| 26 | " | " | " | " | 0.32 | (0.38) | 0.43 | Δ |
| 27 | " | " | " | " | 1.22 | (1.47) | 1.67 | O |
| 28 | " | " | " | " | 1.95 | (2.35) | 2.67 | O |
| 29 | " | " | " | " | 2.08 | (2.50) | 2.84 | X |
| 30 | " | " | " | " | (0.65) | (1.47) | (2.04) | X |
| 31 | " | " | " | " | 0.31 | 0.37 | (0.42) | Δ |
| 32 | " | " | " | " | 0.61 | 0.73 | (0.83) | O |
| 33 | " | " | " | " | 1.93 | 2.32 | (2.64) | O |
| 34 | " | " | " | " | 2.03 | 2.45 | (2.78) | Δ |
| 35 | " | " | " | " | 2.53 | 3.05 | (3.47) | X |
| 36 | " | " | " | " | 0.49 | (0.59) | (1.53) | X |

TABLE 2

Case where Growth Rate of Film on Support Is 2000 Å
(Sputtering Source Is Used)

| Sample No. | Film Growth Rate (Å/min) | Cooling Capacity of can Ra (μm) | Temp. | Base | $T_1/Y_1$ | | | Evaluation |
|---|---|---|---|---|---|---|---|---|
| | | | | | i = 1 | i = 2 | i = 3 | |
| 1 | 2000 | 0.090 | 250 | PET | (0.10) | 0.13 | 0.26 | X |
| 2 | " | " | " | " | (0.15) | 0.20 | 0.24 | Δ |
| 3 | " | " | " | " | (0.20) | 0.27 | 0.33 | O |
| 4 | " | " | " | " | (0.80) | 1.00 | 1.20 | O |
| 5 | " | " | " | " | (1.30) | 1.60 | 1.93 | Δ |
| 6 | " | " | " | " | (0.80) | (1.50) | 1.81 | X |
| 7 | " | " | " | " | 0.15 | (0.20) | 0.24 | X |
| 8 | " | " | " | " | 0.20 | (0.26) | 0.30 | Δ |
| 9 | " | " | " | " | 0.75 | (2.00) | 1.20 | O |
| 10 | " | " | " | " | 1.20 | (1.60) | 1.93 | O |
| 11 | " | " | " | " | 1.28 | (1.70) | 2.05 | X |
| 12 | " | " | " | " | (0.40) | (1.00) | (1.70) | X |
| 13 | " | " | " | " | 0.19 | 0.25 | (0.30) | Δ |
| 14 | " | " | " | " | 0.38 | 0.50 | (0.60) | O |
| 15 | " | " | " | " | 1.20 | 1.58 | (1.90) | O |
| 16 | " | " | " | " | 1.26 | 1.68 | (2.00) | Δ |
| 17 | " | " | " | " | 1.57 | 2.08 | (2.50) | X |
| 18 | " | " | " | " | 0.30 | (0.40) | (1.10) | X |
| 19 | " | " | " | " | PI | (0.16) | 0.19 | 0.22 | X |

TABLE 2-continued

Case where Growth Rate of Film on Support Is 2000 Å
(Sputtering Source Is Used)

| Sample No. | Film Growth Rate (Å/min) | Cooling Capacity of can Ra (μm) | Temp. | Base | $T_1/Y_1$ i = 1 | i = 2 | i = 3 | Evaluation |
|---|---|---|---|---|---|---|---|---|
| 20 | " | " | " | " | (0.24) | 0.29 | 0.33 | Δ |
| 21 | " | " | " | " | (0.33) | 0.40 | 0.45 | O |
| 22 | " | " | " | " | (1.30) | 1.57 | 1.78 | O |
| 23 | " | " | " | " | (2.11) | 2.54 | 2.89 | Δ |
| 24 | " | " | " | " | (1.30) | (2.21) | 2.52 | X |
| 25 | " | " | " | " | 0.24 | (0.29) | 0.33 | X |
| 26 | " | " | " | " | 0.32 | (0.38) | 0.43 | Δ |
| 27 | " | " | " | " | 1.22 | (1.47) | 1.67 | O |
| 28 | " | " | " | " | 1.95 | (2.35) | 2.67 | O |
| 29 | " | " | " | " | 2.08 | (2.50) | 2.84 | X |
| 30 | " | " | " | " | (0.65) | (1.47) | (2.04) | X |
| 31 | " | " | " | " | 0.31 | 0.37 | (0.42) | Δ |
| 32 | " | " | " | " | 0.61 | 0.73 | (0.83) | O |
| 33 | " | " | " | " | 1.93 | 2.32 | (2.64) | O |
| 34 | " | " | " | " | 2.03 | 2.45 | (2.78) | Δ |
| 35 | " | " | " | " | 2.53 | 3.05 | (3.47) | X |
| 36 | " | " | " | " | 0.49 | (0.59) | (1.53) | X |

TABLE 3

Case where Growth Rate of Film on Support Is 60,000 Å
(Sputtering Source Is Used)

| Sample No. | Film Growth Rate (Å/min) | Cooling Capacity of can Ra (μm) | Temp. | Base | $T_1/Y_1$ i = 1 | i = 2 | i = 3 | Evaluation |
|---|---|---|---|---|---|---|---|---|
| 1 | 60,000 | 0.090 | 250 | PET | (0.10) | 0.13 | 0.26 | X |
| 2 | " | " | " | " | (0.15) | 0.20 | 0.24 | Δ |
| 3 | " | " | " | " | (0.20) | 0.27 | 0.33 | O |
| 4 | " | " | " | " | (0.80) | 1.00 | 1.20 | O |
| 5 | " | " | " | " | (1.30) | 1.60 | 1.93 | Δ |
| 6 | " | " | " | " | (0.80) | (1.50) | 1.81 | X |
| 7 | " | " | " | " | 0.15 | (0.20) | 0.24 | X |
| 8 | " | " | " | " | 0.20 | (0.26) | 0.30 | Δ |
| 9 | " | " | " | " | 0.75 | (2.00) | 1.20 | O |
| 10 | " | " | " | " | 1.20 | (1.60) | 1.93 | O |
| 11 | " | " | " | " | 1.28 | (1.70) | 2.05 | X |
| 12 | " | " | " | " | (0.40) | (1.00) | (1.70) | X |
| 13 | " | " | " | " | 0.19 | 0.25 | (0.30) | Δ |
| 14 | " | " | " | " | 0.38 | 0.50 | (0.60) | O |
| 15 | " | " | " | " | 1.20 | 1.58 | (1.90) | O |
| 16 | " | " | " | " | 1.26 | 1.68 | (2.00) | Δ |
| 17 | " | " | " | " | 1.57 | 2.08 | (2.50) | X |
| 18 | " | " | " | " | 0.30 | (0.40) | (1.10) | X |
| 19 | " | " | " | PI | (0.16) | 0.19 | 0.22 | X |
| 20 | " | " | " | " | (0.24) | 0.29 | 0.33 | Δ |
| 21 | " | " | " | " | (0.33) | 0.40 | 0.45 | O |
| 22 | " | " | " | " | (1.30) | 1.57 | 1.78 | O |
| 23 | " | " | " | " | (2.11) | 2.54 | 2.89 | Δ |
| 24 | " | " | " | " | (1.30) | (2.21) | 2.52 | X |
| 25 | " | " | " | " | 0.24 | (0.29) | 0.33 | X |
| 26 | " | " | " | " | 0.32 | (0.38) | 0.43 | Δ |
| 27 | " | " | " | " | 1.22 | (1.47) | 1.67 | O |
| 28 | " | " | " | " | 1.95 | (2.35) | 2.67 | O |
| 29 | " | " | " | " | 2.08 | (2.50) | 2.84 | X |
| 30 | " | " | " | " | (0.65) | (1.47) | (2.04) | X |
| 31 | " | " | " | " | 0.31 | 0.37 | (0.42) | Δ |
| 32 | " | " | " | " | 0.61 | 0.73 | (0.83) | O |
| 33 | " | " | " | " | 1.93 | 2.32 | (2.64) | O |
| 34 | " | " | " | " | 2.03 | 2.45 | (2.78) | Δ |
| 35 | " | " | " | " | 2.53 | 3.05 | (3.47) | X |
| 36 | " | " | " | " | 0.49 | (0.59) | (1.53) | X |

TABLE 4

| Remarks | Thickness of film formed (μm) | Y modulus ($Y_i$) (kg/mm$^2$) |
|---|---|---|
| Nonmagnetic support 10 alone (i = 1) | — | 400 |
| After inner surface coated with Permalloy film through cylindrical can 11 (i = 2) | 0.55 | 530 |
| After outer surface coated with Permalloy film through cylindrical | 0.47 | 640 |

TABLE 4-continued

| Remarks | Thickness of film formed (μm) | Y modulus $(Y_i)$ (kg/mm$^2$) |
| --- | --- | --- |
| can 12 (i = 3) | | |

EXAMPLE 2

A magnetic recording medium was produced using the same film preparation conditions as in Example 1, except that polyimide (PI) was used as the nonmagnetic support.

The Young's modulus of the support and the total Young's moduli of the support and the thin metal films are shown in Table 5.

TABLE 5

| Remarks | Thickness of film formed (μm) | Y modulus $(y_i)$ (kg/mm$^2$) |
| --- | --- | --- |
| Nonmagnetic support 10 alone (i = 1) | — | 650 |
| After inner surface coated with Permalloy film through cylindrical can 11 (i = 2) | 0.55 | 780 |
| After outer surface coated with Permalloy film through cylindrical can 12 (i = 3) | 0.47 | 890 |

Results of changing the tension ($T_i$) suitably in the same manner as in Example 1 are shown in Sample Nos. 19 to 36 in Tables 1 to 3. It is apparent from these results that a high-quality magnetic recording medium is obtained under production conditions in which both conditional expressions (1) and (2) of the present invention are satisfied.

We claim:

1. A method for producing a magnetic recording medium in which a flexible nonmagnetic support is moved continuously while being kept in contact with a plurality of spaced cylindrical cans to form thin films of metal on said support successively at portions were said support is in contact with said cylindrical cans, wherein the improvement comprises: adjusting the tension of said support with respect to the Young's modulus of said support in each of a plurality n of support conveyance sections which are defined by said spaced apart cylindrical cans, to satisfy the relations:

$$5.0 \times 10^{-4} < T_i/Y_i < 3.0 \times 10^{-3} \quad (1)$$

$$-7.0 \times 10^{-4} < \Delta(T_i/Y_i) < 7.0 \times 10^{-4} \quad (2)$$

in which $\Delta(T_i/Y_i) = T_i/Y_i - T_{i-1}/Y_{i-1}$, $T_i$ is the tension per unit of cross-sectional area of a one of said support conveyance sections in a sequential position i among said n support conveyance sections in a forward direction of support conveyance, and $Y_i$ is the Young's modulus of said one of said support conveyance sections in said sequential position i on which $T_i$ acts, where i = 1, 2, . . . n.

2. The method for producing a magnetic recording medium according to claim 1, wherein said flexible support is made of plastic resin.

3. The method for producing a magnetic recording medium according to claim 1, wherein said thin films of metal are formed by sputtering.

4. The method for producing a magnetic recording medium according to claim 1, wherein said thin films of metal are formed by evaporation.

* * * * *